United States Patent [19]
Carnell et al.

[11] Patent Number: 5,431,361
[45] Date of Patent: Jul. 11, 1995

[54] CRASHWORTHY CYCLIC CONTROL STICK SYSTEM FOR A HELICOPTER

[75] Inventors: Brian L. Carnell, Rocky Hill; J. David Fansler, Oxford, both of Conn.

[73] Assignee: United Technologies Corporation, Hartford, Conn.

[21] Appl. No.: 161,766

[22] Filed: Dec. 2, 1993

[51] Int. Cl.⁶ .................. B64C 13/04; B64D 25/00
[52] U.S. Cl. ..................... 244/234; 244/121; 74/524
[58] Field of Search ............ 244/234, 121, 229; 74/524

[56] References Cited

U.S. PATENT DOCUMENTS

| | | | |
|---|---|---|---|
| 4,655,416 | 4/1987 | Carnell et al. | 244/234 |
| 4,811,921 | 3/1989 | Whitaker et al. | 244/234 |
| 4,887,782 | 12/1989 | Carnell et al. | 244/234 |

Primary Examiner—William Grant
Attorney, Agent, or Firm—Terrance J. Radke

[57] ABSTRACT

A crashworthy cyclic control stick system (10) for use in combination with an energy attenuating stroking crew seat (100) includes a cyclic control stick (11) and an actuating/attenuating mechanism (50). The cyclic control stick (11) includes an upper tube subassembly (14U) having a first hinge fitting (22), a lower tube subassembly (14L) having a second hinge fitting (24), the first hinge fitting (22) being mounted in pivotable combination with the second hinge fitting (24) along a hinge pivot axis (26) the and a locking mechanism (30) mounted in pivotable combination with the first hinge fitting (22) and interactively connected to the second hinge fitting (24) to preclude pivotal movement between the hinge fittings (22, 24). The actuating/attenuating mechanism (50) includes a first uniextensible absorber (56) secured in combination with the crew seat (100), a second uniextensible absorber (58) secured in combination with an energy absorber (132) of the crew seat (100), a release tube (60) disposed in interactive combination with the uniextensible absorbers (56, 58), and a cable (52) interconnected to the locking mechanism (30) and the release tube (60). In response to stroking of the crew seat (100) as a result of a crash landing, the first absorber (56) extends and the cable (52) is concomitantly displaced to unlock the locking mechanism (30), causing the first hinge fitting (22) to pivot about the second hinge fitting (24) the cyclic control stick (11) is displaced forwardly. After the extension of the first absorber (56), the first absorber (56) is operative to hold the cable (52) in position, and the second absorber (58) extends to disconnect the release tube (60) to preclude further displacement of the cable (52) during crew seat (100) stroking.

18 Claims, 7 Drawing Sheets

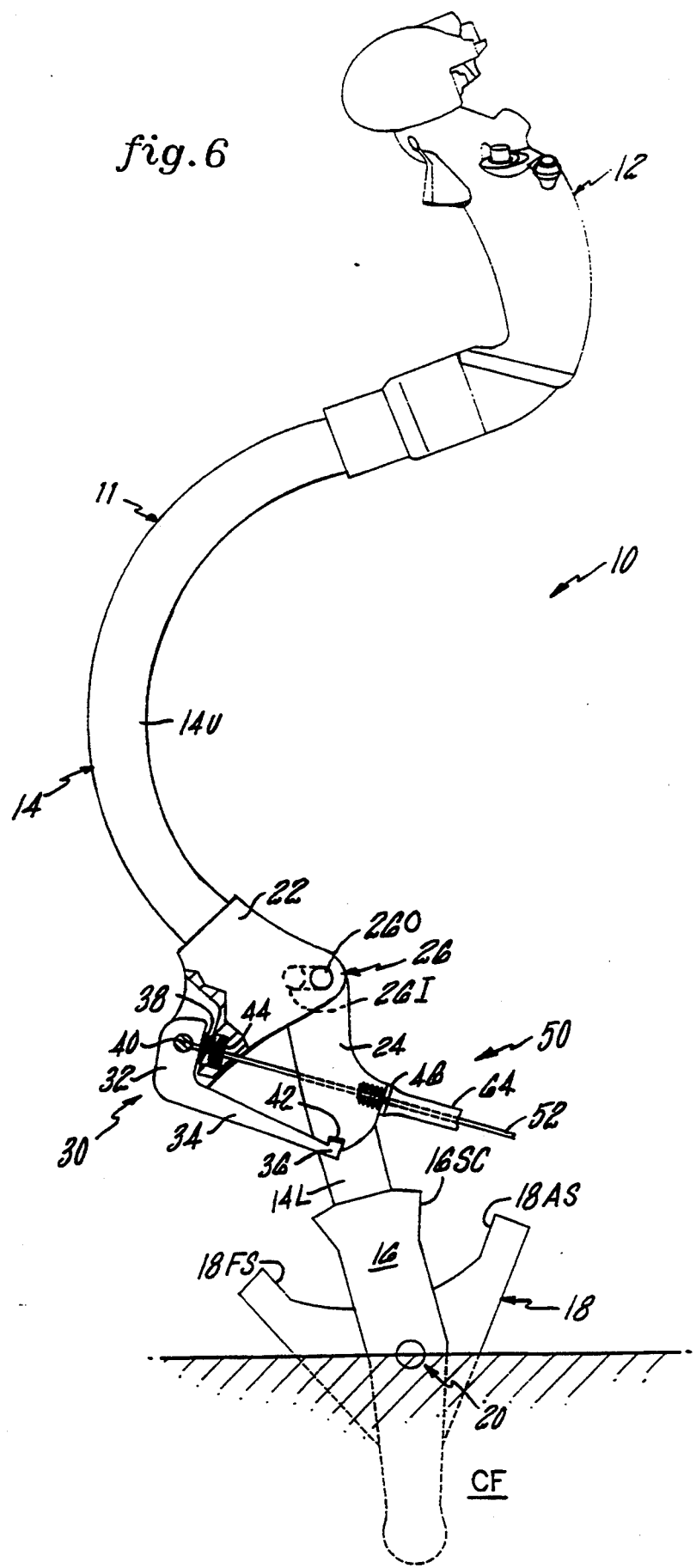

CRASHWORTHY CYCLIC CONTROL STICK SYSTEM FOR A HELICOPTER

DESCRIPTION

1. Technical Field

The present invention relates to cyclic control sticks for helicopters, and more particularly, to a crashworthy cyclic control stick system for a helicopter that is configured and operative for use in combination with an energy attenuating stroking crew seat to minimize the risk of injury to the pilot as a result of impacting tile cyclic control stick in the event of a severe crash landing.

2. Background of the Invention

Concern for the safety of helicopter flight crews (pilot, co-pilot) in the event of a crash landing is a major concern for helicopter design engineers. This concern has led to the development of crashworthy energy attenuating stroking crew seats for the flight crew such as that described in U.S. Pat. No. 4,655,416 and as described hereinbelow in further detail. Energy attenuating stroking crew seats are operative to undergo a downward vertical displacement on the order of a foot or so in the event of landing forces that exceed a predetermined g-force level, i.e., a severe crash landing. The crashworthy crew seat is configured and functions in such a manner that the g-forces experienced during a crash landing are partially absorbed by the crew seats, thus mitigating some of the injury that would normally be inflicted upon the helicopter flight crew members as a result of the high "g" loads experienced in a severe crash landing.

An exemplary crashworthy energy attenuating stroking crew seat is illustrated in FIGS. 1 A, 1B. The crew seat 100 comprises a frame 102, a bucket seat 104, a seat cushion 106, a back cushion 108, a headrest cushion 110, and a restraint subsystem 112 that includes an inertia reel. The frame 102 includes spaced-apart basemembers 114 having rollers 116 that interface with tracks TR secured to the cockpit floor CF. Each basemember 114 further includes a spring-loaded adjustment device 118 that interacts with the tracks TR to lock the crew seat 100 in a selected longitudinal position. Longitudinal adjustment of the crew seat 100 is accomplished by the crew member activating a fore/aft control handle 120 interconnected to the spring-loaded adjustment device 118 by means of a cable 122 to release the spring-loaded adjustment device 118 wherein the spaced-apart basemembers 114 are disengaged and movable along the tracks TR by means of the rollers 116. Releasing the fore/aft control handle 120 locks the crew seat 100 in the desired longitudinal position.

The frame 102 further includes spaced-apart load limiting struts 124, spaced-apart guide tubes 126, and a plurality of crossmembers, e.g., an upper crossmember 128, a middle crossmember 129, and a lower crossmember, 130 as illustrated in FIG. 1B. The load limiting struts 124 may be secured to the upper or middle crossmember 128 or 129 (middle crossmember 129 as illustrated in FIG. 1B) and the rearward portion of the basemembers 114 and are operative to maintain the crew seat 100 in the illustrated configuration during normal flight operations. When subjected to the g-forces of a severe forward or forward/lateral crash landing, the load limiting struts 124 elongate at a constant rate to limit the g-forces exerted on the crew seat 100.

The guide tubes 126 function as races for linear bearing assemblies (not shown) that allow vertical translation of the bucket seat 104, i.e., a vertical energy attenuating stroke, with respect to the frame 102 during a crash landing. Spaced-apart energy absorbers 132 (either variable load or fixed load) are mounted in translatable combination with the guide tubes 126 (e.g., by a bracket connection) and affixed to vertical adjustment mechanisms 134 secured to the back of the bucket seat 104. Vertical inertial crash loads exceeding the predetermined g-force limit, e.g., about 14.5 g's or greater, cause a downward vertical displacement of the bucket seat 104 against the resistance provided by the energy absorbers 132 such that the inertial crash load is attenuated by the functioning of the energy absorbers 132, i.e., an energy attenuating stroke. The vertical adjustment mechanisms 134 are manually operative to adjust the vertical positioning of the bucket seat 104 with respect to the cockpit floor CF. Counterbalance springs 136 are connected between the energy absorbers 132 and lower end of the back of the bucket seat 104 and are operative to carry the weight of the bucket seat 104 and the occupant during vertical adjustment thereof.

For the crew seat 100 described hereinabove, the downward travel or stroking of the crew seat 100 is controlled by the energy absorbers 132 that interconnect the bucket seat 104 to the frame 102. While such functioning of the crew seat 100 provides a measure of protection for the crew member against the g-forces experienced during a severe crash landing, the severe downward and/or forward impact velocities associated with crash landings gives rise to other injury risks for the crewmen. Severe downward and/or forward impact velocities generally cause corresponding downward and/or forward motions of a crewman's head and upper torso, i.e., "uncontrolled motion", even with the restraint system 112 tightened and the inertia reel locked. Such uncontrolled motion of the crewman's head and upper torso may result in head or upper torso impact's with the cyclic control stick which is normally positioned between the crewman's legs (FIG. 1 of the '416 patent illustrates an uncontrolled motion zone for a crew member as a result of the downward and/or forward impact velocities associated with crash landings).

There is an aggravation of the risk of injury for the crew member as a result of the downward stroking of the crew seat 100 during a severe crash landing. More specifically, downward stroking of the crew seat 100 causes a change in the uncontrolled motion zone of the crew member (see FIG. 2 of the '416 patent for the uncontrolled motion zone resulting from such downward stroking) that compounds the risk that the crew member will experience a head or upper torso impact with the cyclic control stick.

In addition, some crashworthy energy attenuating stroking seats limit the loading on seat support structures such as tile tracks TR. These seats incorporate additional load limiting devices that allow forward movement of the crew seat when the load on the crew seat and tile crew member reaches a predetermined magnitude (the use of this type of crew seat today is atypical). Motion of the crew member in both the forward and downward directions as a result of such crew seat displacement further increases the risk of head or upper torso impact with the cyclic control stick inasmuch as large uncontrolled motions of the crew member's head or upper torso occur as a result of seat stroking. Furthermore, the position of the cyclic control stick (see reference numeral 150 in FIG. 1A), which is normally gripped in the crew member's right hand, may be indeterminate at the onset of a crash landing, particularly where the crash landing is the result of main rotor blade contact with an environmental object which may result in feedback through the flight control system that induces uncontrolled movements in the cyclic control stick.

Thus, helicopter design engineers are greatly concerned with alleviating or eliminating the hazard of head or upper torso impacts with the cyclic control stick during severe crash landings. One approach has been to modify the configuration of the cyclic control stick 150 by adding a foam cushion to the hand grip (see reference numeral 152 in FIG. 1A) of the cyclic control stick 150 and a slip joint in the lower portion of the tube assembly of the cyclic control stick 150 such that if an impact occurs with the cyclic control stick 150, the foam cushion will absorb some of the impact energy and the tube assembly will be displaced to absorb some of the impact energy. However, while dynamic testing of such modified cyclic control sticks has demonstrated that impact loads during severe crash landings are less severe than those experienced with an unmodified cyclic control stick, the impact load levels associated with the modified cyclic control stick are still of such magnitude as to cause unconsciousness in the affected crew member. Another approach to alleviating risk injury as a result of impacts with the cyclic control stick is described in the '416 patent.

The cyclic control stick 150 illustrated in FIG. 1A is part of a modified cyclic control stick system that incorporates a pyrotechnic subsystem of the type described in the '416 patent that is operative to provide gas pressure to reposition the cyclic control stick 150 in the event of a severe crash landing, e.g., landing g-forces in excess of about 14.5 g's. The cyclic control stick 150 includes a stick repositioning mechanism 154 that is operative to maintain the cyclic control stick 150 in a normal flight configuration (see FIGS. 3, 5 of the '416 patent) during normal flight operations and during landings wherein the landing g-forces do not exceed about 14.5 g's, and which is operative in response to a severe crash landing to pivot the upper portion of the cyclic control stick 150 longitudinally forward to a crash landing configuration (see FIG. 6 of the '416 patent). The pyrotechnic subsystem is installed in combination with the crew member seat such that downward stroking thereof causes initiation of the pyrotechnic subsystem which generates a gas which is transmitted to the stick repositioning mechanism 154. The gas drives a piston in the stick repositioning mechanism 154 to displace a linkage which causes a bracket and the upper portion of the cyclic control stick 150 to be displaced longitudinally forward out of the uncontrolled motion zone of the crew member. Further details regarding the structural configuration and functioning of the modified cyclic control stick system described hereinabove may be found in the '416 patent.

While the modified cyclic control stick system described in the preceding paragraph is functionally adequate to substantially eliminate crew member injuries due to impacts with the cyclic control stick during a crash landing, this system has not been incorporated in helicopter cockpits. There is a strong resistance to the use of pyrotechnics such as the pyrotechnic subsystem described in the '416 patent in the cockpit environment of a helicopter.

There exists a need to develop a crashworthy cyclic control stick system to alleviate the risk of injury to a flight crew member from impact with the cyclic control stick system during a severe crash landing. The cyclic control stick system should be configured for use in combination with an energy attenuating stroking crew seat and should utilize an actuating system that provides a mechanical force to displace the cyclic control stick out of the uncontrolled motion zone of the crew member. The cyclic control stick should be configured for forward displacement out of the uncontrolled motion zone, and preferably, for simultaneous lateral and longitudinal forward displacement. The cyclic control stick system should include means for preventing bounce back of the cyclic control stick once the cyclic control stick has been displaced forwardly out of the uncontrolled motion zone. The cyclic control stick system should further include means for terminating the mechanical force once the cyclic control stick has been displaced forwardly out of the uncontrolled motion zone.

SUMMARY OF THE INVENTION

One object of the present invention is to provide a crashworthy cyclic control stick system for use in combination with an energy attenuating stroking crew seat that is operative as a result of a severe crash landing to displace the cyclic control stick forwardly, and preferably laterally and longitudinally forwardly simultaneously, out of the uncontrolled motion zone of a crew member such that the risk of injury to the crew member as a result of an impact with the cyclic control stick is effectively eliminated.

Another object of the present invention is to provide a crashworthy cyclic control stick system for use in combination with an energy attenuating stroking crew seat that generates a mechanical force in response to stroking of the crew seat to displace the cyclic control stick forwardly out of the uncontrolled motion zone of a crew member such that the risk of injury to the crew member as a result of an impact with the cyclic control stick is effectively eliminated.

Still a further object of the present invention is to provide a crashworthy cyclic control stick system for use in combination with an energy attenuating stroking crew seat that includes a cyclic control stick having a configuration that facilitates forward displacement, and preferably simultaneous lateral and longitudinal forward displacement, of the cyclic control stick out of the uncontrolled motion zone of a crew member as a result of a severe crash landing such that the risk of injury to the crew member as a result of an impact with the cyclic control stick is effectively eliminated.

Yet a further object of the present invention is to provide a crashworthy cyclic control stick system for use in combination with an energy attenuating stroking crew seat wherein the mechanical force generated by stroking of the crew seat is provided by an actuating/attenuating mechanism that includes a cable interconnected to the cyclic control stick.

Still another object of the present invention is to provide a crashworthy cyclic control stick system for use in combination with an energy attenuating stroking crew seat wherein the actuating/attenuating mechanism includes means for holding the cyclic control stick in position after the cyclic control stick has been displaced forwardly out of the uncontrolled motion zone of a crew member.

Yet another object of the present invention is to provide a crashworthy cyclic control stick system for use in combination with an energy attenuating stroking crew seat that includes means for disconnecting the cable from the stroking crew seat to preclude further displacement of the cable after the cable has been displaced a predetermined distance to displace the cyclic control stick forwardly out of the uncontrolled motion zone of a crew member.

These and other objects are achieved by means of a crashworthy cyclic control stick system according to the present invention for use in combination with an energy attenuating stroking crew seat that includes a cyclic control stick and an actuating/attenuating mechanism. The cyclic control stick includes a grip assembly, a socket assembly, a yoke assembly, an upper tube subassembly having a first hinge fitting, a lower tube subassembly having a second hinge fitting, and a locking mechanism. The first hinge fitting is mounted in pivotable combination with the second hinge fitting along a hinge pivot axis such that the combination of the first hinge fitting, the upper tube subassembly, and the grip assembly define an actively displaceable segment of the cyclic control stick. In a preferred embodiment of the invention, the hinge pivot axis lies in a horizontal plane above the legs of the crew member and is skewed either clockwise or counterclockwise with respect to the vertical axis of the helicopter. Alternatively, the hinge pivot axis is parallel to the lateral axis of the helicopter. The locking mechanism is mounted in pivotal combination with the first hinge fitting, and is interactively connected to the second hinge fitting and normally operative to lock the first hinge fitting in combination with the second hinge fitting such that rotation of the first hinge fitting with respect to the second hinge fitting is precluded.

The actuating/attenuating mechanism is disposed in combination with the energy attenuating stroking crew seat and is operative, in response to stroking of the crew seat as a result of a severe crash landing, to provide the mechanical force required to displace the actively displaceable segment of the cyclic control stick forwardly, and preferably, simultaneously laterally and longitudinally forwardly. The mechanism includes a first uniextensible absorber mounted in combination with the frame of the crew seat, a second uniextensible absorber mounted in combination with an energy absorber of the crew seat, a release tube disposed in interactive combination with the first and second uniextensible absorbers, and a flexible, sheathed cable having one end secured to the locking mechanism of the cyclic control stick and the other end secured to the release tube. The flexible, sheathed cable allows unrestricted movement of the crew seat within the cockpit by the crew member.

In response to stroking of the crew seat as a result of a crash landing, the first uniextensible absorber extends and the cable is concomitantly displaced a predetermined distance. The displacement of the cable causes a pivotal movement of the locking mechanism to unlock the locking mechanism and to cause the first hinge fitting to pivot about the second hinge fitting along the hinge pivot axis. Due to the skewness of the hinge pivot axis in the preferred embodiment of the crashworthy cyclic control stick system, the actively displaceable segment of the cyclic control stick is not only displaced longitudinally forward as a result of the cable displacement, but is simultaneously displaced laterally. Upon a predetermined extension of the first uniextensible absorber, the first uniextensible absorber is operative to hold the cable in position, thereby precluding bounce back of the cyclic control stick towards the crew seat. After the predetermined extension of the first uniextensible absorber, which causes displacement of the cyclic control stick out of the uncontrolled movement zone, continued stroking of the crew seat causes the second uniextensible absorber to extend to disconnect the release tube from interactive combination with the first and second uniextensible absorbers, thereby allowing the crew seat to stroke freely with no further displacement induced in the cyclic control stick.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIGS. 5 and 6 are each side plan views of the cyclic control stick of FIG. 2 according to a form of the present invention which includes a skewed pivot axis.

DETAILED DESCRIPTION OF PREFERRED EMBODIMENTS

Figure 1A:
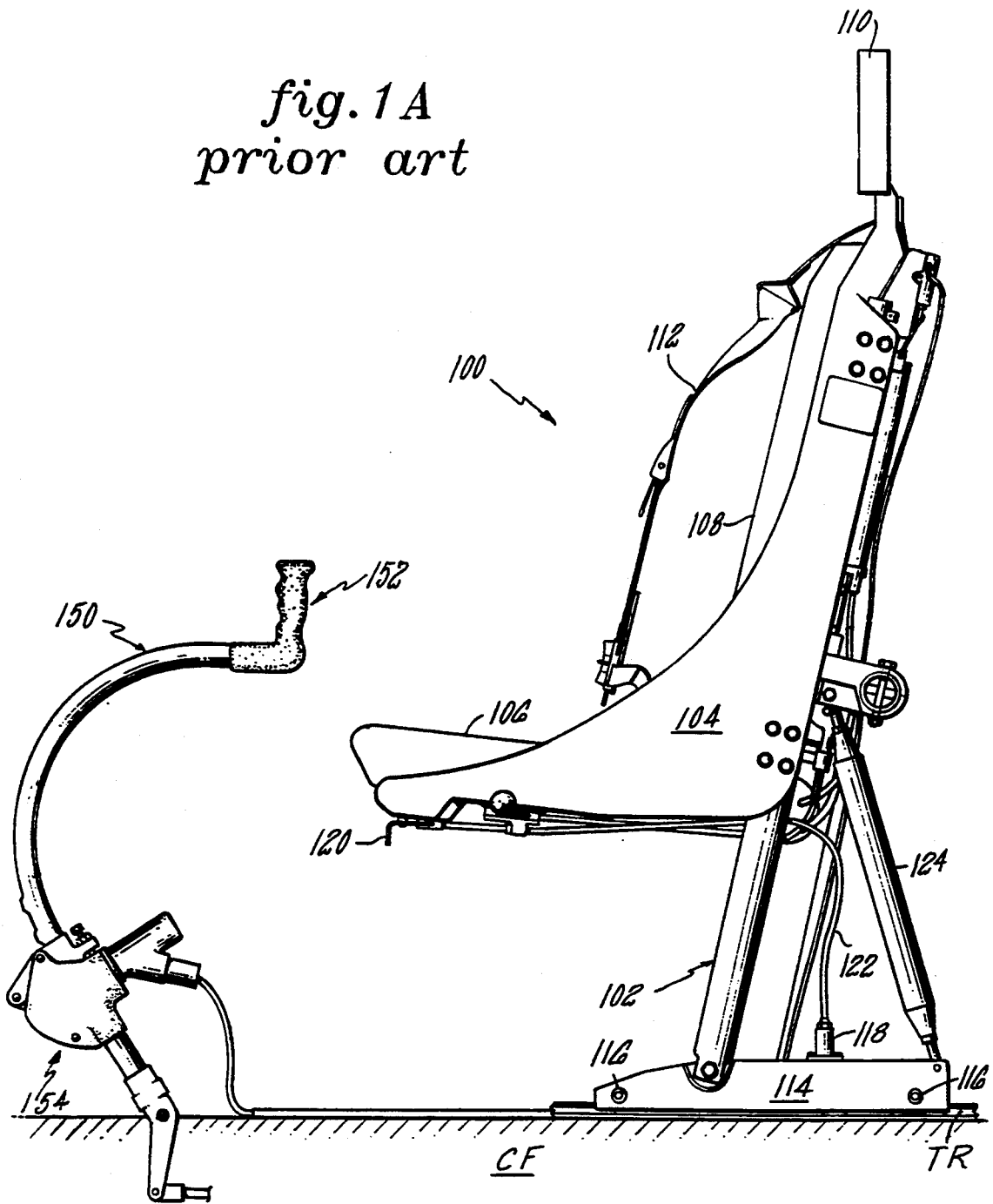
FIG. 1A is a side plan view of a crashworthy energy attenuating stroking crew seat.
Figure 1B:
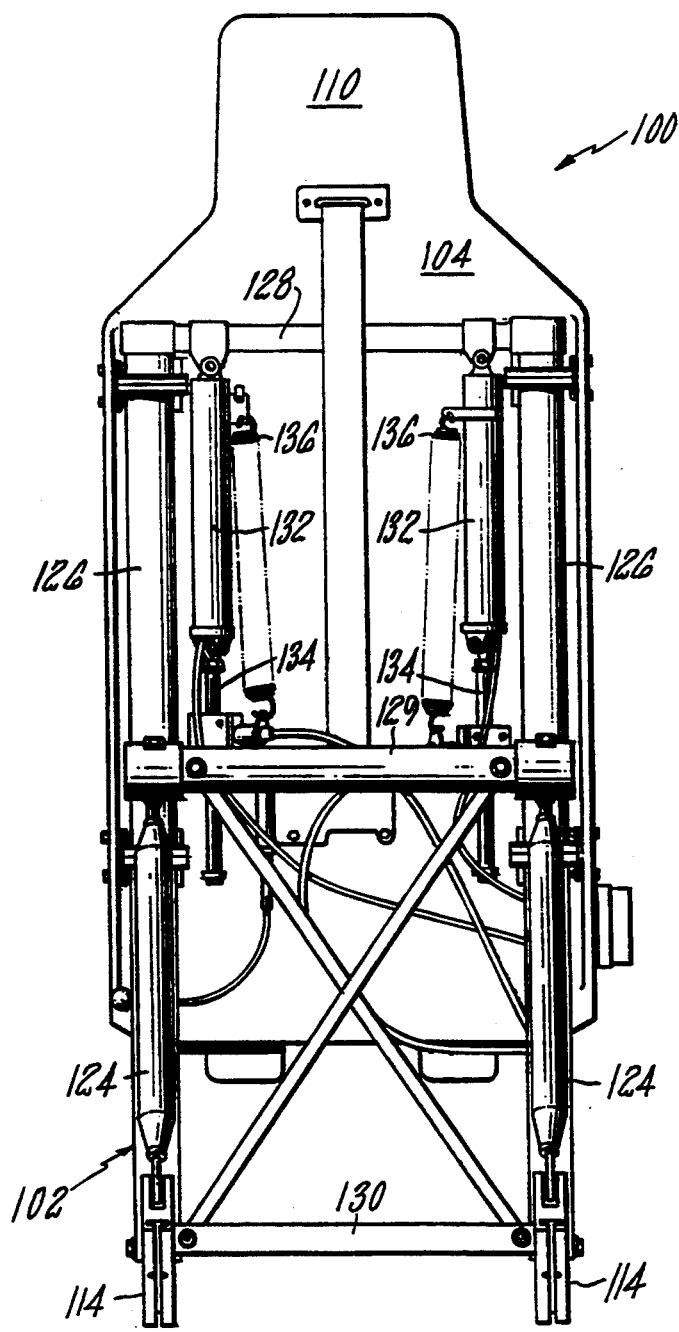
FIG. 1B is a rear plan view of the crashworthy energy attenuating stroking crew seat of FIG. 1A.
Figure 2:
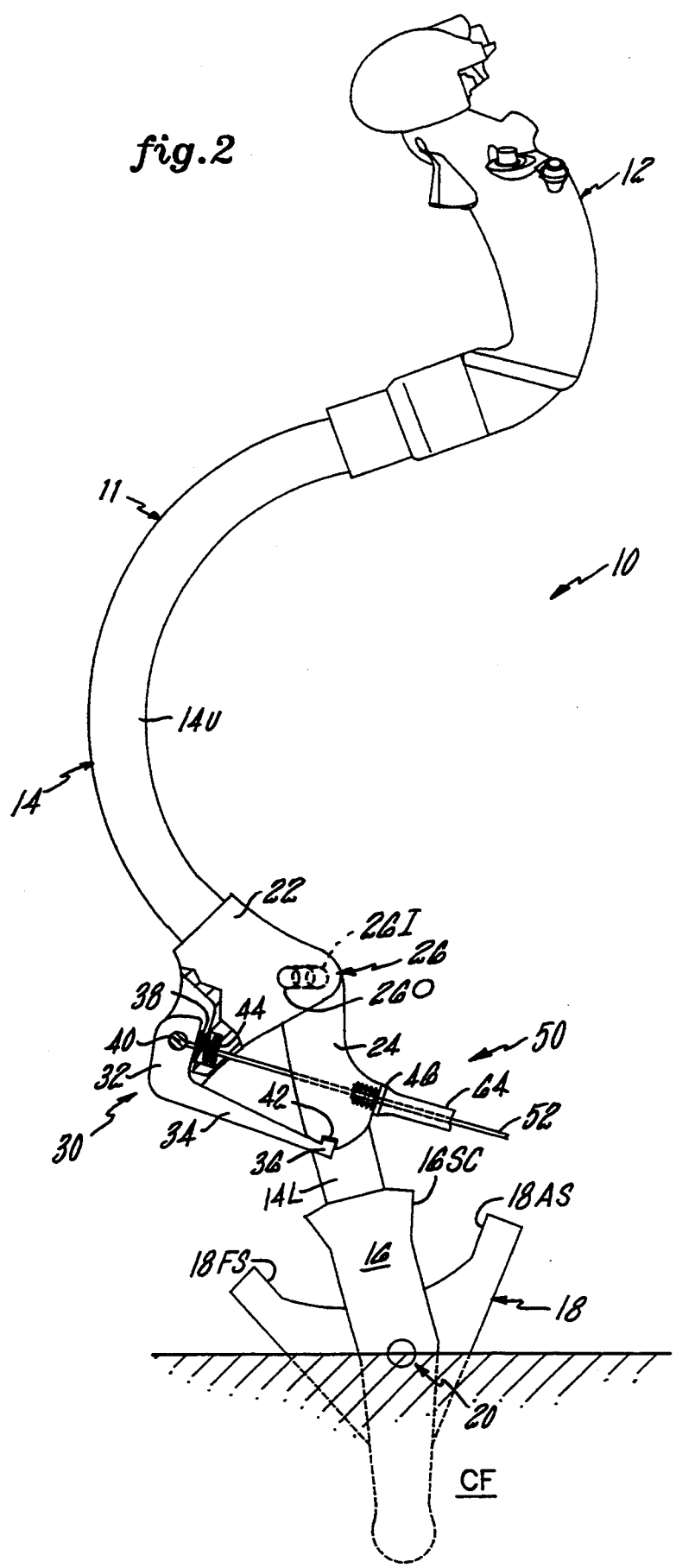
FIG. 2 is a side plan view of a cyclic control stick of the crashworthy cyclic control stick system according to the present invention in a normal configuration for helicopter flight operations.
Figure 3:
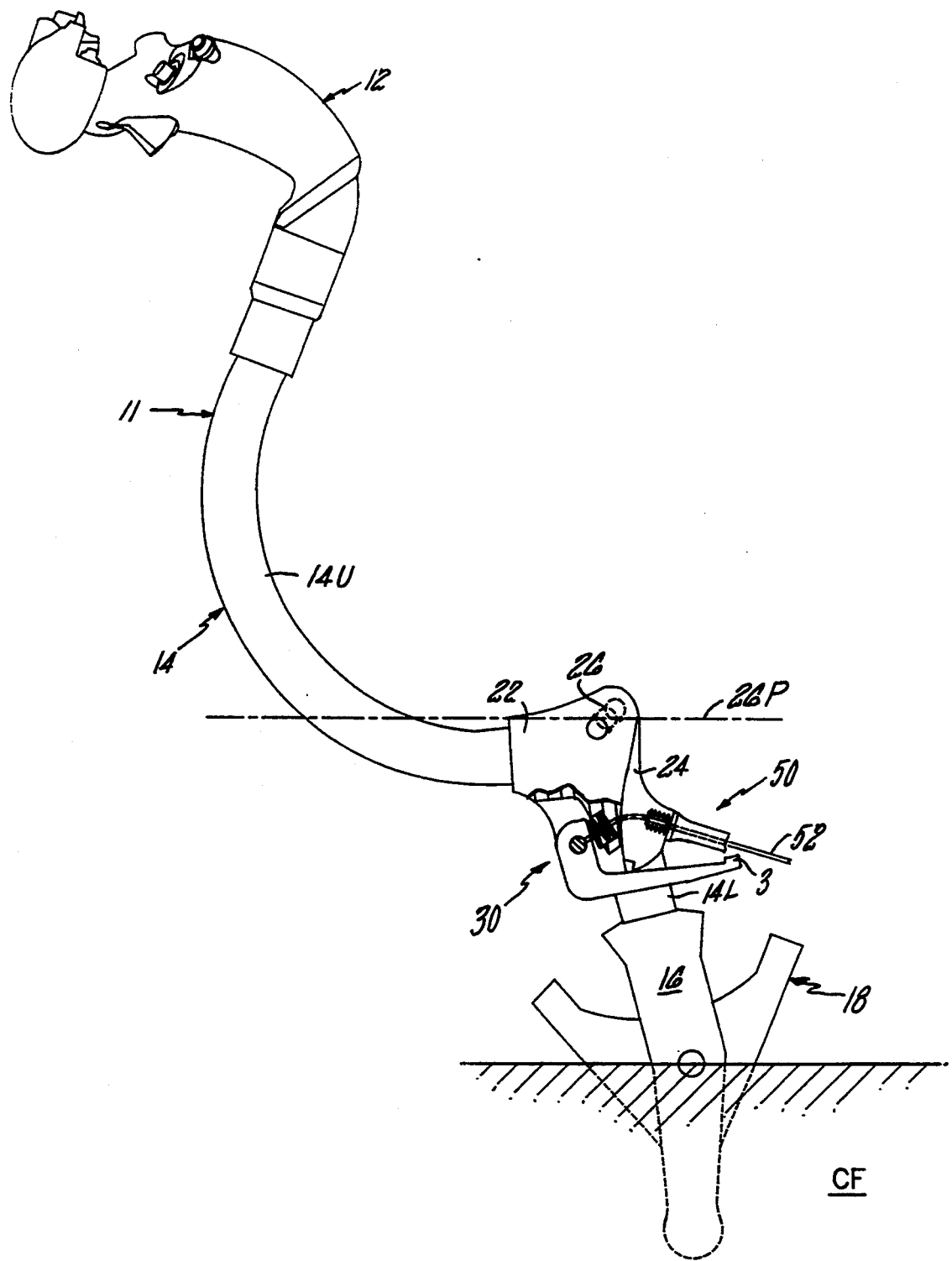
FIG. 3 is a side plan view of the cyclic control stick of FIG. 2 in a crash landing configuration.
Figure 4:
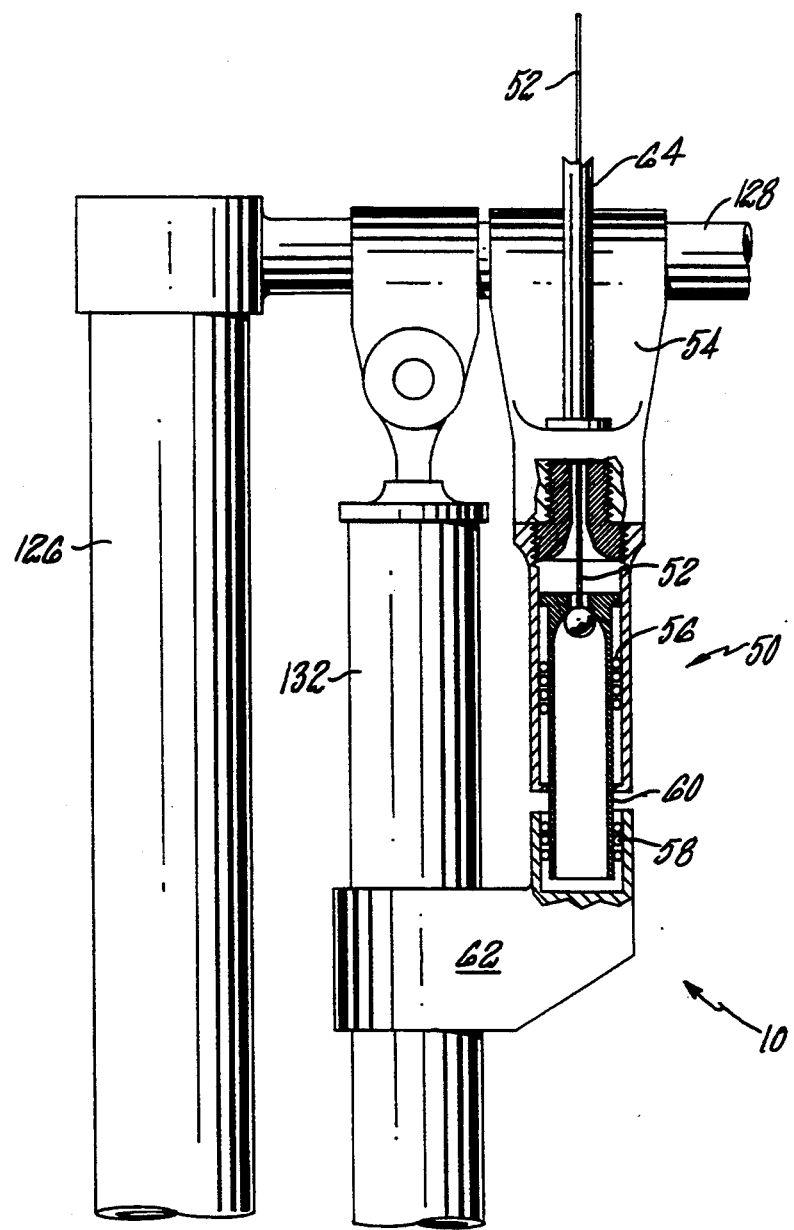
FIG. 4 is a plan view of the actuating/attenuating mechanism of the crashworthy cyclic control stick system according to the present invention.

Referring now to the drawings wherein like reference characters identify corresponding or similar elements throughout the several views, FIGS. 2-4 illustrate a crashworthy cyclic control stick system 10 according to the present invention. The cyclic control stick system 10 is configured and operative for use in combination with an energy attenuating vertical stroking crew seat of the type described hereinabove to minimize the risk of injury to the pilot from impact with the cyclic control stick during a severe crash landing by pivoting the cyclic crew stick out of the uncontrolled movement zone of the crew member. The cyclic control stick system 10 comprises a cyclic control stick 11 and an actuating/attenuating mechanism 50. The cyclic control stick 11 is manually manipulable in the longitudinal and/or lateral directions to provide pitch and roll control inputs to the main rotor assembly of a helicopter. The cyclic control stick 10 is configured so that the upper segment thereof may be pivoted forwardly, and preferably laterally and longitudinally forwardly simultaneously, with respect to the lower segment thereof. The actuating/attenuating mechanism 50 is operative in response to a severe crash landing to generate a mechanical force to pivotably displace the cyclic control stick 11 out of the uncontrolled movement zone of the corresponding crew member.

The cyclic control stick 11 includes a grip assembly 12, a tube assembly 14, a socket assembly 16, and a yoke assembly 18 as illustrated in FIG. 2. The configurations and functions of the grip assembly 12, the socket assembly 16, and the yoke assembly 18 are structurally and functionally equivalent to the corresponding assemblies as found in the cyclic control sticks installed in the H-60 helicopter series manufactured by the assignee of the present invention. The grip assembly 12 allows the pilot to manually grasp and manipulate the cyclic control stick 11 in the longitudinal and/or lateral directions to provide pitch and roll control inputs to the helicopter main rotor assembly (not shown) to control the flight profile of the helicopter with respect to the pitch and roll axes thereof. The grip assembly 12 may also include electronic buttons and switches that are electrically interconnected to other helicopter subsystems through wiring routed through the tube and socket assemblies 14, 16 to provide the pilot with various functional capabilities, e.g., a pitch trimming capability. These functional elements of the grip assembly 12 are conventional features known to those skilled in the art, and hence are not described in further detail herein.

The socket assembly 16 is supported in the yoke assembly 18 and configured for rotation about a fore/aft pivot point 20 that allows the cyclic control stick 11 to be moved longitudinally, i.e., forwardly and aftwardly displaced. The socket assembly 16 includes a stop collar 16SC that physically engages fore and aft stops 18FS, 18AS of the yoke assembly 18 to delimit the fore and aft displacements of the cyclic control stick system 11. In addition to providing the fore/aft stops 18FS, 18AS which limit the fore/aft motion of the cyclic control stick 11, the yoke assembly 18 is configured and operative for lateral pivotal displacements to facilitate lateral inputs through the cyclic control stick 11. The configuration and functional features of the socket assembly 16 and the yoke assembly 18 are conventional features known to those skilled in the art, and hence are not described in further detail herein.

The tube assembly 14 for the cyclic control stick 11 according to the present invention comprises an upper tube subassembly 14U secured in combination with tile grip assembly 12 and a lower tube subassembly 14L secured in combination with the socket assembly 16. A first hinge fitting 22 is secured in combination with the upper tube subassembly 14U and a second hinge fitting 24 is secured in combination with the lower tube subassembly 14L. The combination of the grip assembly 12, tile upper tube subassembly 14U, and the first hinge fitting 22 define the actively displaceable segment of the cyclic control stick 11 according to the present invention.

For the described embodiment, the first hinge fitting 22 is mounted in pivotable combination with the second hinge fitting 24 along a hinge pivot axis 26 (see FIG. 2). The hinge pivot axis 26 lies in a horizontal plane 26P that is a predetermined distance above the cockpit floor CF. Preferably, the hinge pivot axis plane 26P is positioned above the legs of the crew member occupying the crew seat 100. If the horizontal plane of the hinge pivot axis 26 (either of the hinge pivot axis 26 embodiments described in the following paragraph)is positioned above the crew member's legs, the actively displaceable segment of the cyclic control stick 11 does not impact the crew member's legs during the displacement thereof.

Figure 5:
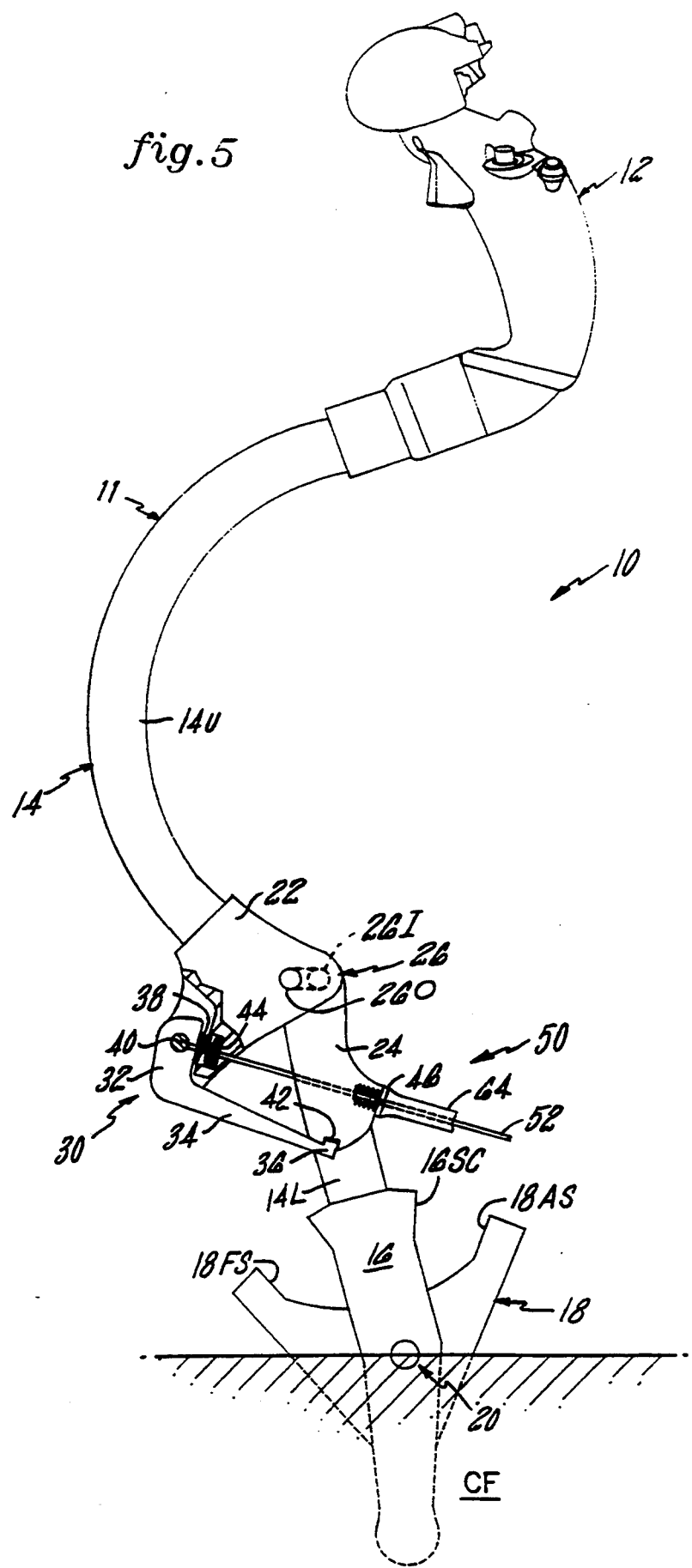

In the preferred embodiment of the crashworthy cyclic control stick system 10 according to the present invention, the hinge pivot axis 26 is skewed with respect to the vertical axis of the helicopter. The skewed hinge pivot axis 26 may be skewed either clockwise or counterclockwise with respect to the vertical axis of the helicopter, e.g., the inboard end 261 of the skewed hinge pivot axis 26 may be longitudinally forward or aft of the outboard end 260 (see reference characters 261-1 and 261-2, respectively in FIGS. 5 and 6 which are views of the left crew seat 100 as viewed from an outboard perspective) or vice versa depending upon the cockpit and the collective/cyclic stick configurations. For a dual pilot side-by-side configuration wherein the cyclic control sticks 11 are right and left handed, the hinge pivot axes 26 for the right and left crew seats 100 are skewed clockwise and counterclockwise, respectively, such that the actively displaceable segment of each cyclic control stick 11 is simultaneously displaceable longitudinally forward and laterally outboard, preferably past the outboard end of the helicopter instrument panel. For a dual pilot side-by-side configuration wherein the cyclic control sticks 11 are identical, the hinge pivot axes 26 are skewed counterclockwise such that the actively displaceable segment of each cyclic control stick 11 is simultaneously displaceable longitudinally forward and laterally leftwardly. For the embodiment of the crashworthy cyclic control stick system 10 wherein the inboard and outboard ends 261, 260 of the hinge pivot axis 26 define a line parallel to the lateral axis of the helicopter, the cyclic control stick 11 is displaceable only longitudinally forwardly.

A locking mechanism 30 is normally operative to lock the actively displaceable segment of the cyclic control stick 11 in combination with the hinge fitting 24 of the lower tube subassembly 14L to define the normal flight configuration of the cyclic control stick 11 illustrated in FIG. 2. The locking mechanism 30 is operative in a severe crash landing, as a result of the mechanical force generated by the actuating/attenuating mechanism 50, to unlock the actively displaceable segment of the cyclic control stick 11 from the second hinge fitting 24 such that the actively displaceable segment is displaceable to the crash landing configuration illustrated in FIG. 3. The locking mechanism 30 includes a head member 32, at least one locking arm 34 having a locking lug 36 (the illustrated embodiment has a pair of spaced-apart locking arms 34—the second arm 34 is hidden in FIG. 2), and a biasing spring 38. The head member 32 is mounted in pivotable combination with the first hinge fitting 22 along a lock pivot axis 40. The locking lug 36 of each locking arm 34 is configured to engage a corresponding complementary notch 42 formed in the second hinge fitting 24 to lock the first hinge fitting 22 in non-pivotable combination with tile second hinge fitting 24. The biasing spring 38 is interposed between the body member 32 and a shoulder 44 of tile first hinge fitting 22 and normally operative to exert a biasing force against the body member 32 to hold the locking lug(s) 36 in engaged combination with the corresponding complementary notch(es) 42, i.e., the locking mechanism 30 is locked such that the first hinge fitting 22 is nonpivotable with respect to the second hinge fitting 24.

The actuating/attenuating mechanism 50 is mounted in combination with an energy attenuating stroking crew seat of the type described hereinabove and is operative in response to a severe crash landing to provide the necessary mechanical force to unlock the locking mechanism 30 and to displace the actively displaceable segment of the cyclic control stick 11 to the crash landing configuration. The actuating/attenuating mechanism 50 comprises a cable 52, a cable connector guide 54, a first uniextensible absorber 56 that provides "bounce back control" for the crashworthy cyclic control stick system 10, a second uniextensible absorber 58 that provides "a disconnect capability" for the cyclic control stick system 10, a release tube 60, and an interconnecting member 62 as illustrated in FIG. 4. The uniextensible absorbers 56, 58 are interactive mechanical devices that are disposed in combination with a complementary component and operative in response to an applied load to limit the complementary component to a unidirectional displacement with respect to the uniextensible absorber. For example, rolling wire Tor-shok®(Tor-shok is a registered trademark of Ara, Inc., a California corporation, for shock absorbers and overload devices for vehicles) devices may be utilized as the uniextensible absorbers 56, 58 in the crashworthy cyclic control stick system 10 according to present invention, as illustrated in FIG. 4.

The cable connector guide 54 is secured in fixed combination with the upper crossmember 128 of the crew seat 100. The first uniextensible absorber 56 is mounted in combination with the cable connector guide 54 and the second uniextensible absorber 58 is mounted in combination with the interconnecting member 62. The interconnecting member 62 is secured in fixed combination with one of the energy absorbers 132 of the crew seat 100. The first and second uniextensible absorbers 56, 58 are disposed in interactive combination by means of the release tube 60.

One end of the cable 52 is secured in fixed combination with the head member 32 of the locking mechanism 30 and the other end is secured in fixed combination with the release tube 60 of the actuating/attenuating mechanism 50. The cable 52 is routed from the head member 32 of the locking mechanism 30, through a cable attachment/positioning bracket 46 of the second hinge fitting 24, and through the cable connector guide 54 to the release tube 60. Between the attachment/positioning bracket 46 and the connector guide 54 the cable 52 is encased in a sheath 64 as illustrated in FIGS. 2, 4. The cable 52 is configured to accommodate a predetermined minimum stroking of the energy attenuating stroking crew seat 100, e.g., about ½ inch for the embodiment described herein, so that the actuating/attenuating mechanism 50 does not generate a mechanical force in response to hard landing conditions, i.e., g-forces less than the g-force levels experienced in a severe crash landing. The accommodating configuration of the cable 52 may be provided, for example, by installing a cable 52 having a predetermined degree of flexibility or utilizing a cable 52 having a length that provides built-in slack between the cable end secured in combination with the head member 32 and the cable end secured in combination with the release tube 60 such that during the first ½ inch of crew seat stroking the cable 52 does not exert a mechanical force. Rather, during the first ½ inch of crew, seat stroking, tension is exerted on the cable 52 to take up the slack or flexibility therein.

In response to a severe crash landing, the energy attenuating stroking crew seat 100 strokes to absorb a portion of the crash landing forces as described hereinabove. With respect to FIG. 4, the energy absorber 132 extends as the crew seat 100 strokes. Due to the securement of the interconnecting member 62 in fixed combination with one of the energy absorbers 132, the actuating/attenuating mechanism 50 is subject to a corresponding downward vertical translation. The actuating/attenuating mechanism 50 is not actuated during the initial stroking of the crew seat 100, e.g., the first ½ inch of downward vertical displacement of the energy absorber 132, as a result of the accommodating configuration of the cable 52. Once the crew seat 100 has undergone more than about ½ inch of downward vertical displacement, the actuating/attenuating mechanism 50 is actuated.

Once the actuating/attenuating mechanism 50 is actuated, further downward stroking of the crew seat 100 causes displacement of the cable 52 of the actuating/attenuating mechanism 50 which exerts an initial mechanical force on the locking mechanism 30 for unlocking thereof. That is, the initial mechanical force exerted by the cable 52 overcomes the biasing force exerted by the biasing spring 38, causing the head member 32 to pivot about the lock pivot axis 40 (in the clockwise direction in FIG. 2). The pivotal movement of the head member 32 causes the locking lug(s)36 to disengage from the corresponding notch(es)42, i.e., the locking mechanism 30 is unlocked, such that the first hinge fitting 22 is pivotable with respect to the second hinge fitting 24. Continued downward stroking of the crew seat 100 causes further displacement of the cable 52 to provide a follow-on mechanical force which causes the first hinge fitting 22 to pivot about the skewed hinge pivot axis 26.

The pivoting motion of the first fitting hinge 22 about the hinge pivot axis 26 causes the actively displaceable segment of the cyclic control stick 11 to pivot longitudinally forward about the hinge pivot axis 26 for either embodiment of the hinge pivot axis 26 described hereinabove. For the preferred embodiment of the crashworthy cyclic control stick system 10 wherein the hinge pivot axis 26 is skewed, the follow-on mechanical force simultaneously causes a lateral displacement of the actively displaceable segment of the cyclic control stick 11 (the direction of the lateral displacement depends upon whether the skewed hinge pivot axis 26 has a clockwise or counterclockwise skew with respect to the vertical axis).

Once the actuating/attenuating mechanism 50 is actuated, the first uniextensible absorber 56 is operative to extend for a predetermined distance as the wire 52 is displaced because of the stroking of the crew seat 100. For the embodiment of the crashworthy cyclic control stick system 10 described herein, the predetermined extension of the uniextensible absorber 56 is within the range of about 1½-4 inches. The predetermined extension of the first uniextensible absorber 56 defines the magnitude of the follow-on mechanical force provided to displace the actively displaceable segment of the cyclic control stick 11 out of the uncontrolled movement zone of the corresponding crew member. After the predetermined extension of the first uniextensible absorber 56, i.e., the first uniextensible absorber 56 "bottoms out" as the release tube 60 abuttingly engages the cable connector guide 54, the first uniextensible absorber 56 is operative to hold the cable 52 in position. That is, the uniextensible absorber 56 prevents any opposed movement of the release tube 60. This prevents the actively displaceable portion of the cyclic control stick 11 from moving back towards its original position for any reason.

Once the first uniextensible absorber 56 bottoms out, i.e., sufficient mechanical force has been exerted by the actuating/attenuating mechanism 50 to displace the cable 52 so that the actively displaceable segment of the cyclic control stick 11 is pivoted out of the uncontrolled movement zone of the corresponding crew member and/or until the actively displaceable segment of the cyclic control stick 11 contacts the helicopter instrument panel, the actuating/attenuating mechanism 50 is operative to preclude any further displacement of the cable 52, i.e., further displacement of the cable 52 is terminated. Further stroking of the crew seat 100 loads the second uniextensible absorber 58 which causes extension thereof in lieu of further displacement of the cable 52. The second uniextensible absorber 58 extends until the release tube 60 breaks away therefrom such that the actuating/attenuating mechanism 50 is disconnected from the energy absorber 132. Disconnection of the actuating/attenuating mechanism 50 precludes any further displacement of the cable 52 as the crew seat 100 continues to stroke. The functioning of the second uniextensible absorber 58 prevents the cable 52 from causing further displacement of the actively displaceable portion of the cyclic control stick 11 and/or breaking of the cable 52 during further stroking of the crew seat 100 after the actively displaceable segment of the cyclic control stick 11 has been displaced out of the uncontrolled movement zone of the corresponding crew member.

The second mechanical force exerted by the actuating/attenuating mechanism 50 causes the first fitting hinge 22 to be pivoted through a predetermined angle with respect to the hinge pivot axis 26 as illustrated in FIG. 3. For the embodiment of the crashworthy cyclic control stick system 10 described herein, the first hinge fitting 22 is pivoted through an angle approximately 45°. The operation of the actuating/attenuating mechanism 50 causes the actively displaceable segment of the cyclic control stick 11 to be moved longitudinally forward, and preferably longitudinally forward and laterally sidewardly, out of the uncontrolled motion zone of the corresponding crew member. Thus, the risk of injury to the crew member as a result of an impact with the cyclic control stick 11 due to a severe crash landing is effectively eliminated utilizing the crashworthy cyclic control stick system 10 according to the present invention.

A variety of modifications and variations of the present invention are possible in light of the above teachings. It is therefore to be understood that, within the scope of the appended claims, the present invention may be practiced otherwise than as specifically described hereinabove.

What is claimed is:

1. A crashworthy cyclic control stick system for use in combination with an energy attenuating stroking crew seat, comprising:

a cyclic control stick including an upper segment and a lower segment, said upper segment being mounted in pivotable combination with said lower segment; and actuating/attenuating mechanism means disposed in combination with the energy attenuating stroking crew seat and operative in response to stroking thereof for providing a mechanical force in response to a severe crash landing to cause said upper segment to pivot with respect to said lower segment;

said pivotable combination being configured to include a pivot axis having one end skewed relative to its other end such that said upper segment is simultaneously displaced laterally and longitudinally forwardly in response to said mechanical force.

2. The crashworthy cyclic control stick system of claim 1 wherein said cyclic control stick further includes means for locking said upper segment in combination with said lower segment such that said upper segment is non-pivotable with respect to said lower segment.

3. The crashworthy cyclic control stick system of claim 2 wherein said locking means is unlocked in response to said mechanical force provided by said actuating/attenuating mechanism means wherein said upper segment is pivotable with respect to said lower segment.

4. The crashworthy cyclic control stick system of claim 1 wherein said actuating/attenuating mechanism means includes means for preventing bounce back of said cyclic control stick once said cyclic control stick is displaced forwardly by said mechanical force provided by said actuating/attenuating mechanism means.

5. The crashworthy cyclic control sticky system of claim 1 wherein said actuating/attenuating mechanism means includes means for terminating said mechanical force once said cyclic control stick is displaced laterally and longitudinally forwardly by said mechanical force provided by said actuating/attenuating mechanism means.

6. A crashworthy cyclic control stick system for use in combination with an energy attenuating stroking crew seat, comprising:

a cyclic control stick including a grip assembly, a socket assembly for providing longitudinal displacement of said cyclic control stick, a yoke assembly disposed in combination with said socket assembly for providing lateral displacement of said cyclic control stick, an upper tube subassembly secured in combination with said grip assembly, a lower tube subassembly secured in combination with said socket assembly, and means for mounting said upper tube subassembly in pivotable combination with said lower tube subassembly; and an actuating/attenuating mechanism disposed in combination with the energy attenuating stroking crew seat, said actuating/attenuating mechanism including a cable having one end secured to said mounting means of said cyclic control stick and means secured to the other end of said cable and the energy attenuating stroking crew seat for displacing said cable a predetermined distance in response to stroking of the energy attenuating stroking crew seat as a result of a severe crash landing;

said predetermined displacement of said cable providing a mechanical force that causes said upper tube subassembly to pivot with respect to said lower tube subassembly wherein said cyclic control stick is displaced forwardly.

7. The crashworthy cyclic control stick system of claim 6 wherein said predetermined displacement of said cable causes said upper tube subassembly to pivot with respect to said lower tube subassembly wherein said cyclic control stick is simultaneously displaced laterally and longitudinally forwardly.

8. The crashworthy cyclic control stick system of claim 6 wherein said mounting means includes means for locking said mounting means such that said upper tube subassembly is nonpivotable with respect to said lower tube subassembly.

9. The crashworthy cyclic control stick system of claim 8 wherein one end of said cable is connected to said locking means such that said predetermined displacement of said cable unlocks said locking means wherein said upper tube subassembly is pivotable with respect to said lower tube subassembly to displace said cyclic control stick forwardly.

10. The crashworthy cyclic control stick system of claim 6 wherein said actuating/attenuating mechanism includes means for preventing bounce back of said cyclic control stick once said cyclic control stick is displaced forwardly due to said predetermined displacement of said cable.

11. The crashworthy cyclic control stick system of claim 6 wherein said actuating/attenuating mechanism includes means for terminating displacement of said cable once said cyclic control stick is displaced forwardly by said mechanical force provided by said actuating/attenuating mechanism.

12. A crashworthy cyclic control stick system for use in combination with an energy attenuating stroking crew seat of a helicopter, the energy attenuating stroking crew seat including a frame and an energy absorber, comprising:

a cyclic control stick including
a grip assembly,
a socket assembly for providing longitudinal displacement of said cyclic control stick,
a yoke assembly disposed in combination with said socket assembly for providing lateral displacement of said cyclic control stick,
an upper tube subassembly secured in combination with said grip assembly,
a first hinge fitting secured in combination with said upper tube subassembly,
a lower tube subassembly secured in combination with said socket assembly,
a second hinge fitting secured in combination with said lower tube subassembly,
said first hinge fitting being mounted in pivotal combination with said second hinge fitting along a hinge pivot axis,
said first hinge fitting, said upper tube subassembly, and said grip assembly in combination defining an actively displaceable segment of said cyclic control stick, and
a locking mechanism mounted in pivotal combination with said first hinge fitting, said locking mechanism including means interacting with said second hinge fitting for locking said locking mechanism to preclude pivotal movement of said first hinge fitting with respect to said second hinge fitting; and
an actuating/attenuating mechanism including
a first uniextensible absorber disposed in combination with the frame of the energy attenuating stroking crew seat,
a second uniextensible absorber disposed in combination with the energy absorber of the energy attenuating stroking crew seat,
a release tube disposed in interactive combination with said first and second uniextensible absorbers, and
a cable having one end secured to said release tube and the other end secured to said locking mechanism of said cyclic control stick;
wherein said cable is displaced a predetermined distance in response to stroking of the energy attenuating stroking crew seat as a result of a severe crash landing;
said predetermined displacement of said cable providing a mechanical force that causes pivotal movement of said locking mechanism to unlock said locking means such that said first hinge fitting is pivotable with respect to said second hinge fitting;
said predetermined displacement of said cable causing said first hinge fitting to pivot about said second hinge fitting along said hinge pivot axis wherein said actively displaceable segment of said cyclic control stick is displaced forwardly.

13. The crashworthy cyclic control stick system of claim 12 wherein said hinge pivot axis is skewed with respect to a vertical axis so that predetermined displacement of said cable causes said cyclic control stick to be simultaneously displaced laterally and longitudinally forwardly.

14. The crashworthy cyclic control stick system of claim 13 wherein said skewed hinge pivot axis has a counterclockwise skew with respect to the vertical axis such that said lateral displacement of said cyclic control stick is a leftwardly lateral displacement.

15. The crashworthy cyclic control stick system of claim 13 wherein said skewed hinge pivot axis has a clockwise skew with respect to the vertical axis such that said lateral displacement of said cyclic control stick is a rightwardly lateral displacement.

16. The crashworthy cyclic control stick system of claim 12 wherein said first uniextensible absorber is subjected to a predetermined extension in response to stroking of the energy attenuating stroking crew seat to cause said predetermined displacement of said cable wherein said first hinge fitting pivots about said second hinge fitting along said hinge pivot axis wherein said cyclic control stick is displaced forwardly, and wherein said first uniextensible absorber is further operative upon said predetermined extension thereof to hold said cable in position wherein said forwardly displaced cyclic control stick is precluded from bouncing back towards the energy attenuating stroking crew seat during the severe crash landing.

17. The crashworthy cyclic control stick system of claim 16 wherein said second uniextensible absorber is operative upon said predetermined extension of said first uniextensible absorber to stop further displacement of said cable by extending in response to continued stroking of the energy attenuating stroking crew seat until said release tube is disconnected therefrom.

18. The crashworthy cyclic control stick system of claim 12 wherein said hinge pivot axis lies in a horizontal plane disposed a predetermined distance above a floor surface of the helicopter cockpit.

* * * * *